US008424826B2

United States Patent
Santos et al.

(10) Patent No.: US 8,424,826 B2
(45) Date of Patent: Apr. 23, 2013

(54) ATTACHMENT APPARATUS FOR AN EXTERNAL POWER SUPPLY

(75) Inventors: David L. Santos, Granite Bay, CA (US); Robert Todd Wells, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/902,824

(22) Filed: Oct. 12, 2010

(65) Prior Publication Data

US 2012/0085872 A1    Apr. 12, 2012

(51) Int. Cl.
    *A47G 1/10*    (2006.01)
(52) U.S. Cl.
    USPC .............. 248/316.7; 248/200; 248/228.7; 248/231.81; 248/689
(58) Field of Classification Search .............. 248/316.7, 248/689, 200, 213.2, 229.26, 229.16, 228.7, 248/230.7, 231.81, 316.8, 918, 210, 238, 248/346.04, 500, 346.03, 201
    See application file for complete search history.

(56) References Cited

U.S. PATENT DOCUMENTS

| 2,986,366 | A | * | 5/1961 | Wesson | 248/285.1 |
| 2,997,270 | A | * | 8/1961 | Farndon | 248/316.8 |
| 3,009,676 | A | * | 11/1961 | Buchwald | 248/229.11 |
| 3,291,179 | A | * | 12/1966 | Lang | 206/316.2 |
| 5,082,225 | A | * | 1/1992 | Nespoli | 248/231.81 |
| 5,195,668 | A | * | 3/1993 | Kunes et al. | 224/312 |
| 5,489,078 | A | * | 2/1996 | Risley | 248/231.81 |
| 5,777,848 | A | | 7/1998 | McAnally et al. | |
| 6,178,086 | B1 | | 1/2001 | Sim et al. | |
| 6,446,924 | B1 | * | 9/2002 | Olson | 248/280.11 |
| 6,484,365 | B1 | * | 11/2002 | Thompson | 24/3.12 |
| 6,685,503 | B1 | | 2/2004 | Huang et al. | |
| 7,113,396 | B2 | | 9/2006 | Chen et al. | |
| 7,443,662 | B2 | | 10/2008 | Chen et al. | |
| 7,883,065 | B2 | * | 2/2011 | Nelson | 248/201 |
| 2003/0034425 | A1 | * | 2/2003 | Hueser | 248/229.16 |
| 2006/0175491 | A1 | * | 8/2006 | Hays | 248/229.16 |

* cited by examiner

Primary Examiner — Anita M King

(57) ABSTRACT

An attachment apparatus is described herein. The attachment apparatus includes a band and a mounting member that extends from the band. The mounting member is adapted to couple an external power supply to the attachment apparatus. The attachment apparatus further includes a fastener member that extends from the band. The fastener member is adapted to couple the attachment apparatus to an exterior panel of an electronic device that is powered by the external power supply.

19 Claims, 10 Drawing Sheets

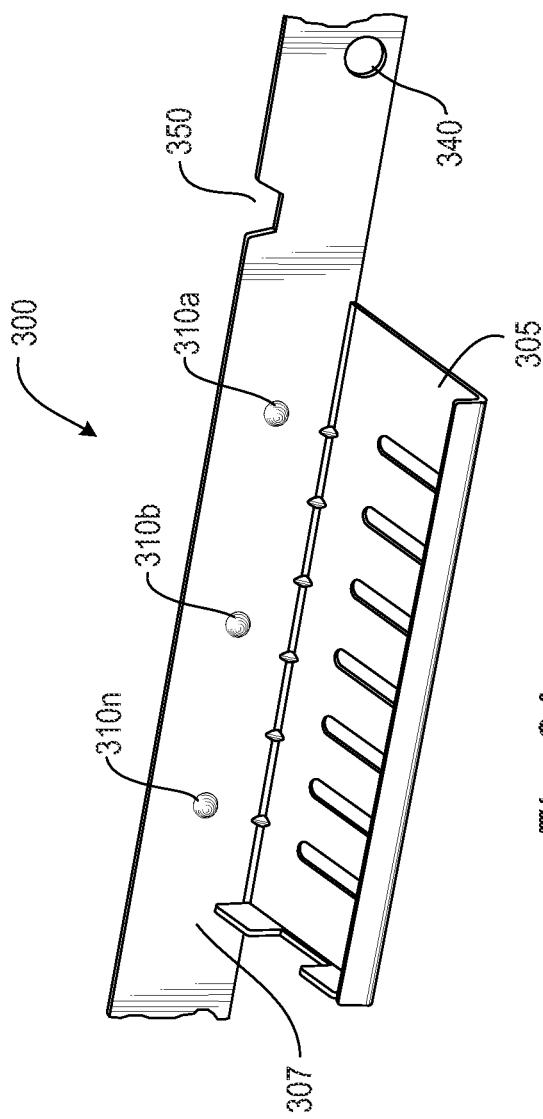
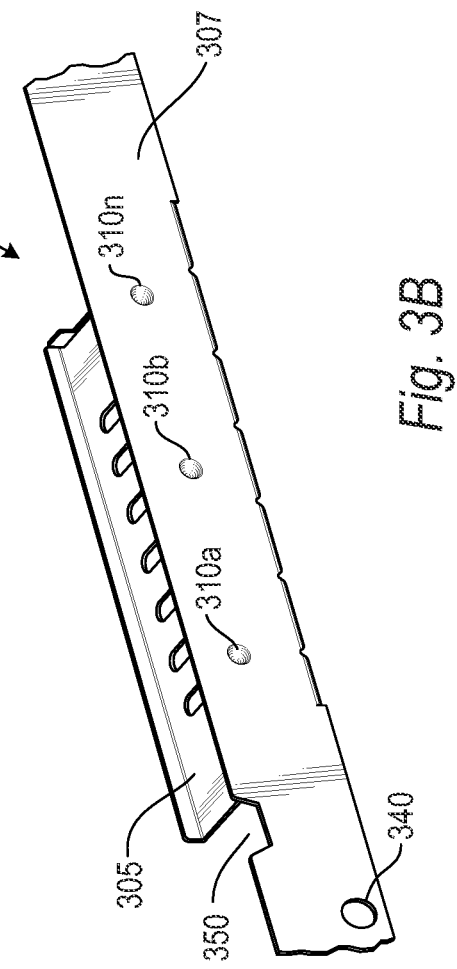

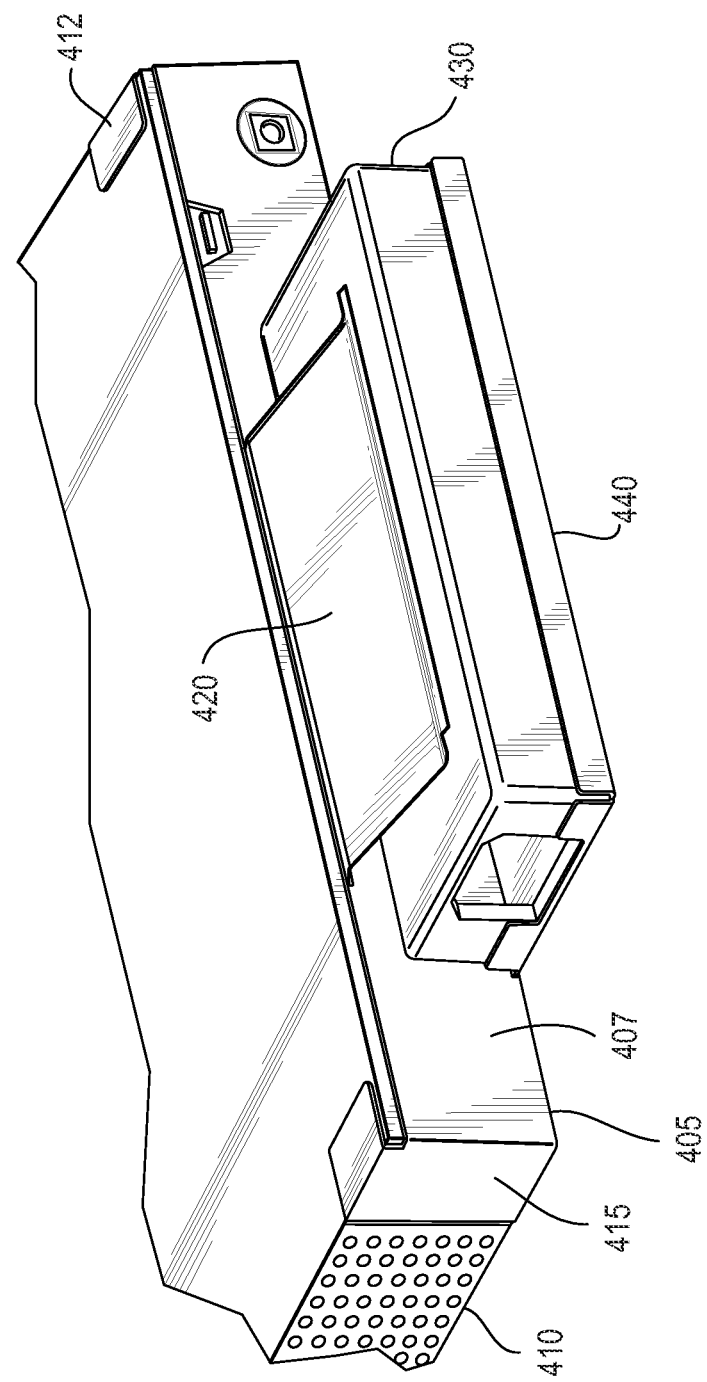

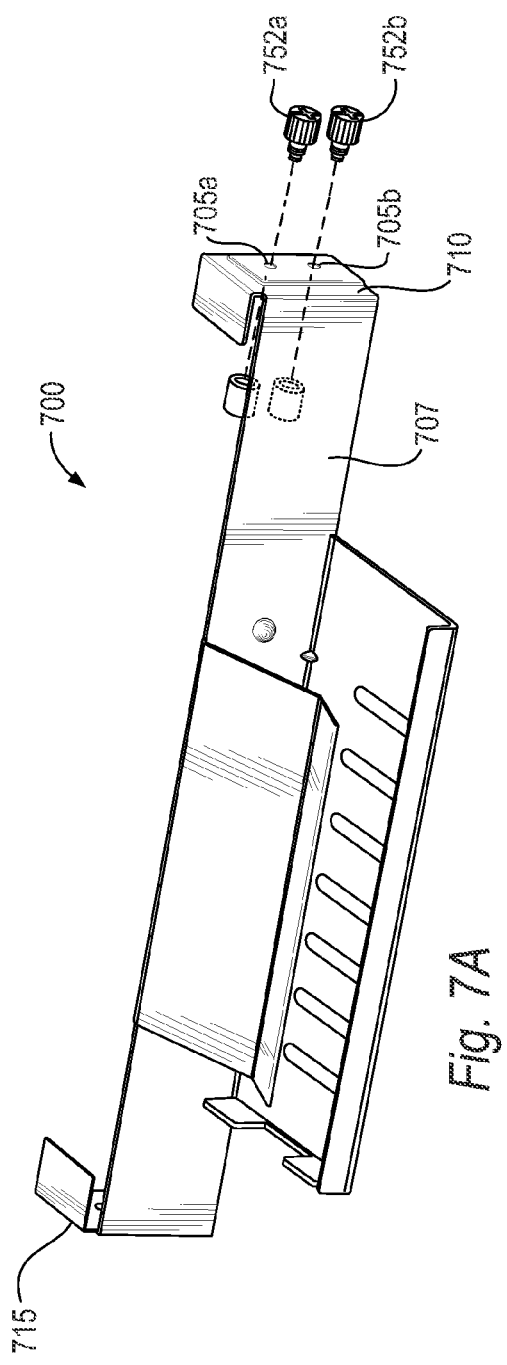
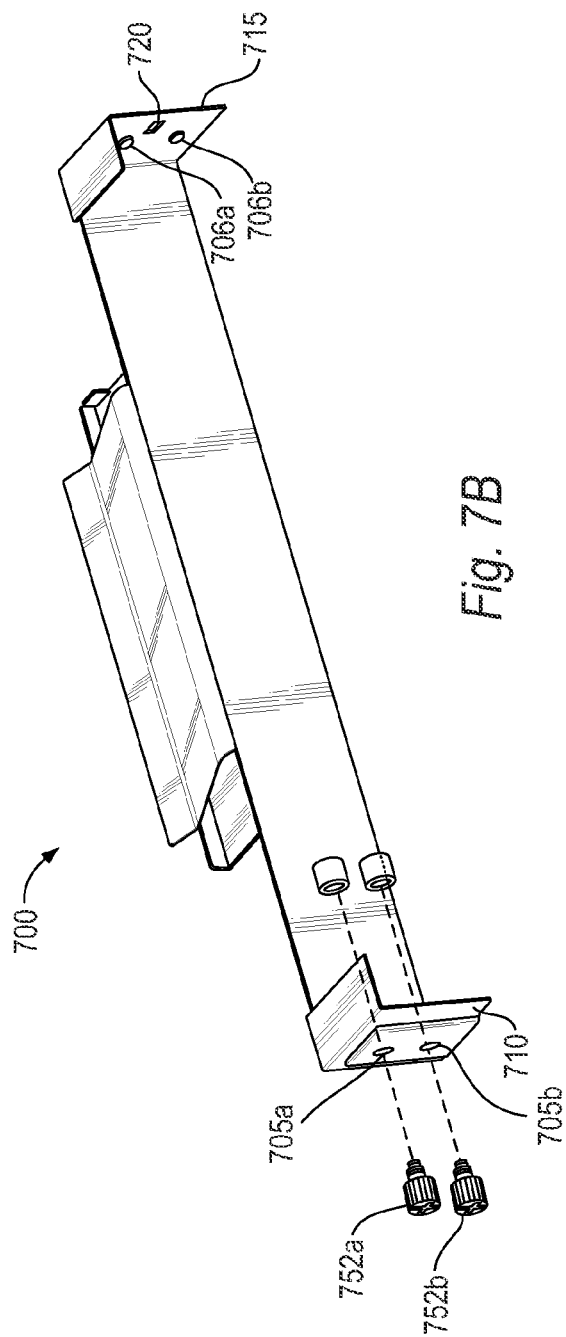

US 8,424,826 B2

ATTACHMENT APPARATUS FOR AN EXTERNAL POWER SUPPLY

I. BACKGROUND

Many types of electronic devices such as computer systems include power supplies which convert incoming alternating current to direct current. Direct current is suitable for operating various electrical components within such devices. Power supplies, also called power adapters, are often mounted within a computer chassis. Power supplies may also be external to the electronic device.

II. BRIEF DESCRIPTION OF THE DRAWINGS

The present disclosure may be better understood and its numerous features and advantages made apparent to those skilled in the art by referencing the accompanying drawings.

FIG. 3A is a front isometric view of an attachment bracket including a base tray and a band in accordance with an embodiment of the invention.

FIG. 3B is a back isometric view of an attachment bracket including a base tray and a band in accordance with an embodiment of the invention.

FIG. 4 is an isometric view of an attachment bracket, a powered device, and an installed power supply in accordance with an embodiment of the invention.

FIG. 7A is a front isometric view of an attachment bracket including a left ear assembly and a right ear assembly in accordance with an embodiment of the invention.

FIG. 7B is a back isometric view of an attachment bracket including a left ear assembly and a right ear assembly in accordance with an embodiment of the invention.

III. DETAILED DESCRIPTION OF THE INVENTION

Electronic devices, such as network devices, may be mounted in various configurations. For example, network devices may be mounted on a two post rack, on a wall, under a desk or simply placed on a desktop, floor, or other horizontal surface. An electronic device may use an external power supply, which is coupled to a power socket on the device via a power cord. As used herein, a powered device is an electrical device that is powered by an external power supply. Often times, the external power supply is segregated from a powered device to which it supplies power. Furthermore, where the powered device is mounted, for example to a two-post rack, the external power supply may dangle precariously from the mounted powered device.

Attachment apparatus are described herein. In one embodiment, an attachment apparatus includes a band and a mounting member that extends from the band. The mounting member is adapted to couple an external power supply to the attachment apparatus. The attachment apparatus further includes a fastener member that extends from the band. The fastener member is adapted to couple the attachment apparatus to an exterior panel of an electronic device that is powered by the external power supply.

Figure 1A:
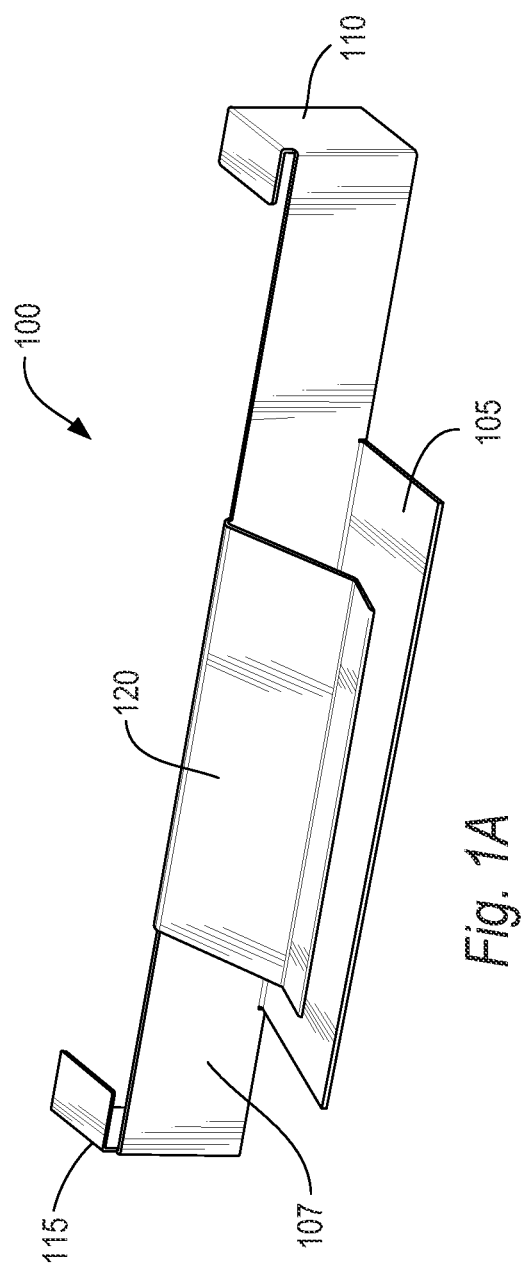
FIG. 1A is an isometric front view of an attachment bracket in accordance with an embodiment of the invention.

FIG. 1A is an isometric front view of an attachment bracket 100 in accordance with an embodiment of the invention. Attachment bracket 100 may be used for coupling an external power supply to the powered device to which it supplies power. In one embodiment, attachment bracket 100 is fabricated from metal, such as sheet metal, and is formed by shaping a single piece of the metal. Attachment bracket 100 includes base tray 105, band 107, right ear assembly 110, left ear assembly 115, and arm 120.

Base tray 105 extends perpendicularly from a first edge of band 107. Arm 120 extends from a second edge of band 107 at an angle toward base tray 105. Arm 120 is a spring-like component, providing a downward compression force when the power adaptor is installed, and the angle at which it extends from band 107 provides adequate support for the external power supply when it is installed in attachment bracket 100.

A mounting member, comprising base tray 105 and arm 120, are configured to provide support for the external power supply. In particular, arm 120 provides support for one side of the external power supply by applying the downward compression force in a first direction, and base tray 105 provides support for an opposing side of the external power supply by applying a force in a second direction, where the second direction opposes the first direction. In one embodiment, the application of these forces produces a friction fit between attachment bracket 100 and the external power supply. When installed, the external power supply is placed between arm 120 and base tray 105. Arm 120 is configured to deflect under the load of the external power supply, provide the prescribed support, and recover its initial shape when unloaded.

Other mounting members, such as zip ties, hook-and-loop fasteners, elastic band, and other fasteners may be used in lieu of arm 120 and/or base tray 105 to couple the external power supply to band 107. In one embodiment, a D-lance or other cable management hardware of appropriate size extends from band 107 and is used in conjunction with the alternative mounting members. For example, the zip ties or hook-and-loop fasteners may loop through the D-lance.

Attachment bracket 100 further includes a fastener member for coupling to the powered device. In one embodiment, the fastener member includes left ear assembly 115, which extends perpendicularly from a third edge of band 107, and right ear assembly 110, which extends perpendicularly from a fourth edge of band 107. The left ear assembly 115 and right ear assembly 110 are coupled to the powered device, for example, using pins, screws, bolts, or other hardware fasteners.

Other types of fastener members and structures may be used in lieu of the ear assemblies to couple attachment bracket 100 to the electronic device. In one embodiment, mounting apertures are defined on band 107 and/or ear assemblies 110 and 115, and are configured such that various different combinations thereof correspond to various different types of electronic devices having various different standard configurations of screw holes or other types of openings.

Figure 1B:
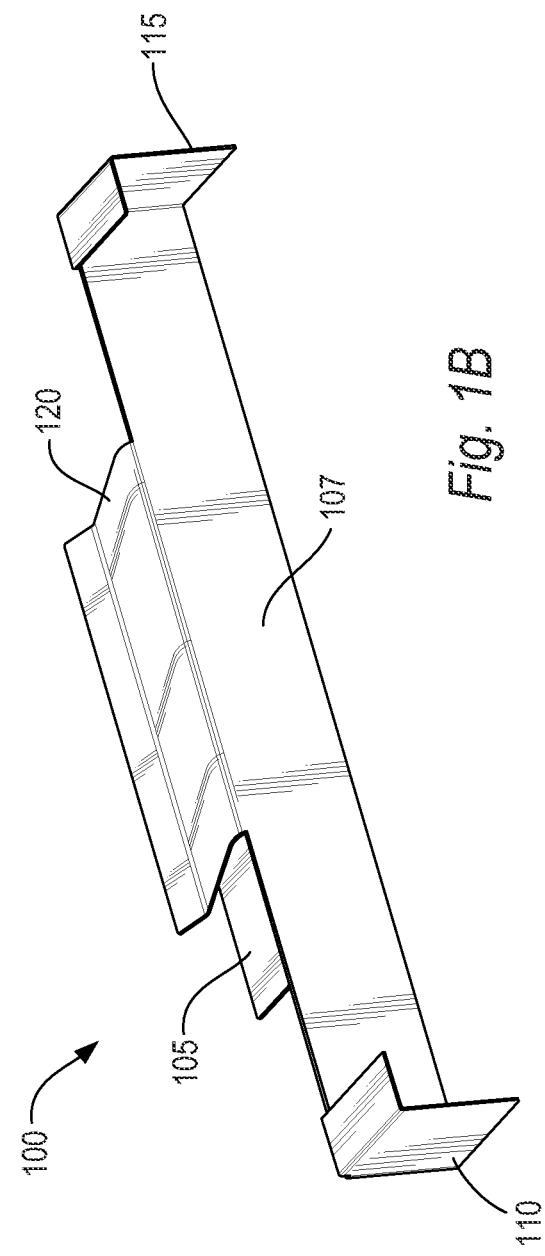
FIG. 1B is an isometric rear view of an attachment bracket in accordance with an embodiment of the invention.

FIG. 1B is an isometric rear view of an attachment bracket 100 in accordance with an embodiment of the invention. As shown, attachment bracket 100 includes base tray 105, band 107, right ear assembly 110, left ear assembly 115, and arm 120.

Figure 1C:
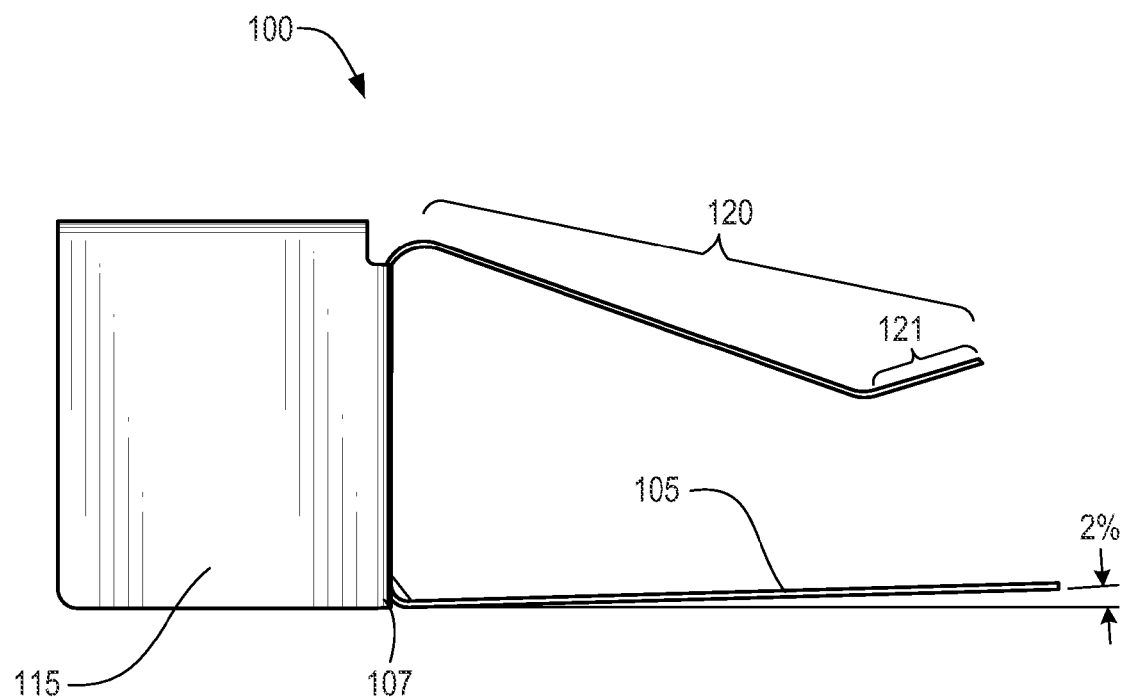
FIG. 1C is a left side view of an attachment bracket in accordance with an embodiment of the invention.

FIG. 1C is a left side view of an attachment bracket 100 in accordance with an embodiment of the invention. As shown, attachment bracket 100 includes base tray 105, band 107, left ear assembly 115, and arm 120. Arm 120 includes an arm handle 121 portion which is a ridge formed along the full length of a first edge of arm 120, where the first edge of arm 120 runs parallel to band 107, preferably by bending a corresponding portion of arm 120 in an upward direction. Arm handle 121 is configured to provide access to release the downward compression force exerted by arm 120, for example, upon an installed power supply. Arm handle 121 may be used by positioning a user's fingers underneath the space created by arm handle 121 and lifting arm handle 121 to release the downward compression force, thus allowing a power supply that is situated between arm 120 and base tray 105 to be removed.

Base tray 105 is formed with a two degree angle of inclination to the horizontal plane. The downward compression force applied to any installed power supply by arm 120 may be firm enough to cause base tray 105, upon which the power supply rests, to slump below the horizontal plane. As such, the slope of base tray 105 is configured to counterbalance this potential slump below the horizontal plane, as may be caused by the downward compression force applied by arm 120. Other angles of inclination may also be implemented to achieve the same.

Figure 1D:
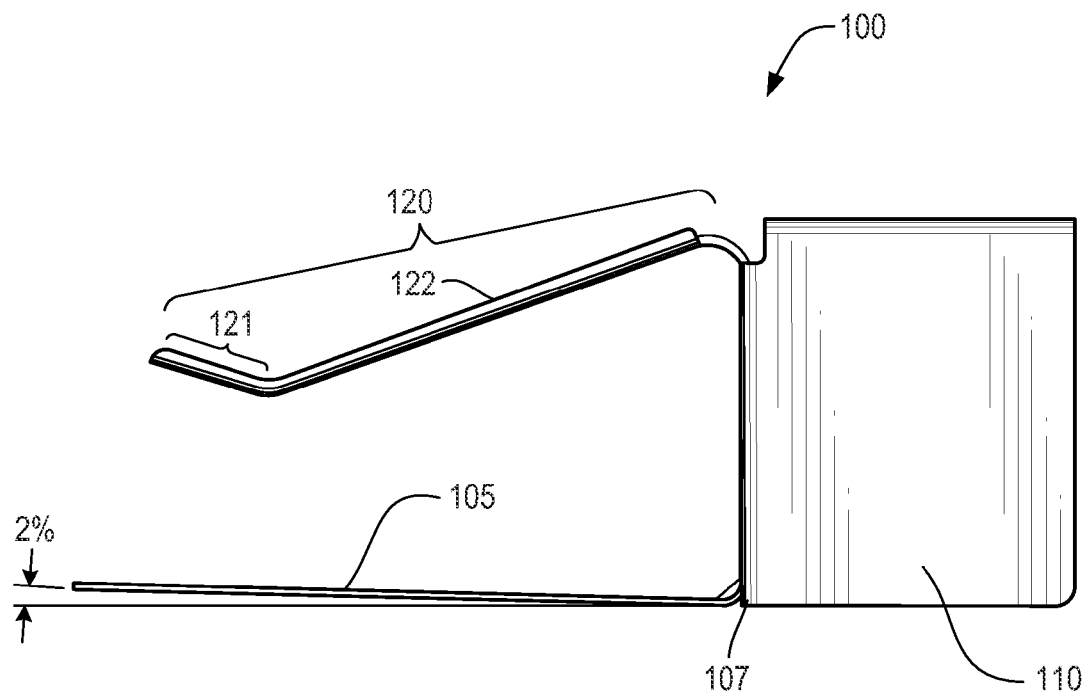
FIG. 1D is a right side view of an attachment bracket in accordance with an embodiment of the invention.

FIG. 1D is a right side view of an attachment bracket 100 in accordance with an embodiment of the invention. As shown, attachment bracket 100 includes base tray 105, band 107, right ear assembly 110, and arm 120. Base tray 105 is formed with a two degree angle of inclination with the horizontal plane. Arm 120 includes an arm handle 121 and an arm stiffener 122 formed along the full length of a second edge of arm 120, where the second edge of arm 120 runs perpendicular to band 107 and parallel to the plane of right ear assembly 110, preferably by bending a corresponding marginal portion of arm 120 in an upward direction. In one embodiment, the second edge is the edge of arm 120 that is located in closest proximity to right ear assembly 110. Arm stiffener 122 extends along a second edge of arm 120 and is configured to stiffen or otherwise add rigidity or otherwise increase the stiffness of arm 120 with respect to bending movements (e.g., flexibility) about an axis that traverses the second edge. Various types of stiffeners may be implemented to achieve different degrees of flexibility. In one embodiment, the second edge is a point of entry where the power supply can be slid into place during installation in attachment bracket 100.

Figure 2A:
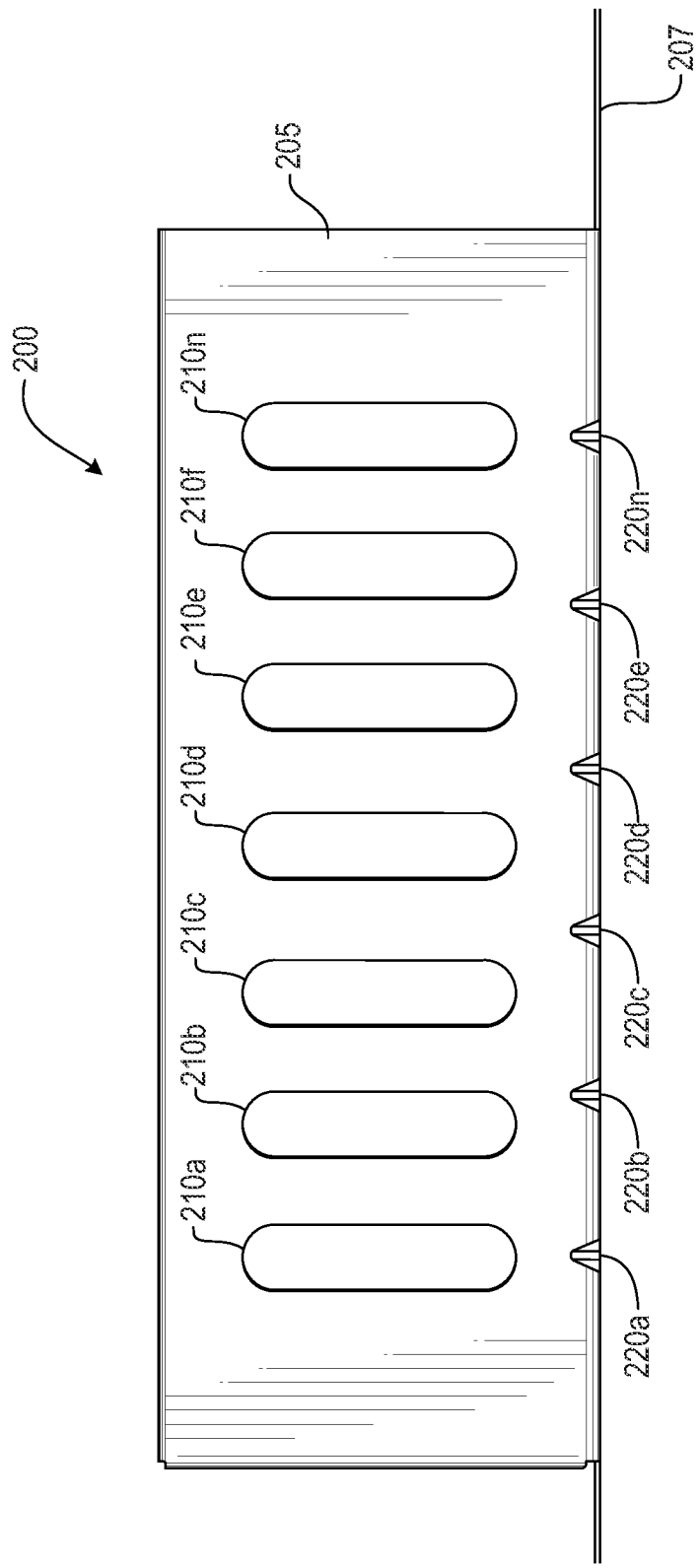
FIG. 2A is a bottom view of an attachment bracket including a base tray and a band in accordance with an embodiment of the invention.

FIG. 2A is a bottom view of an attachment bracket 200 including a base tray 205 and a band 207 in accordance with an embodiment of the invention. Base tray 205 includes ventilation slots 210a-n for heat dissipation. A plurality of tray stiffeners 220a-n are formed at an edge portion where band 207 adjoins base tray 205 for stiffening or otherwise adding rigidity to tray 205 with respect to bending movements (e.g., flexibility) about an axis that traverses this adjoining edge portion. For example, when an external power supply is installed in attachment bracket 200, tray stiffeners 220a-n provide additional rigidity for tray 205 to support the combination of the compression force exerted by the arm and the weight of the external power supply. Various types of stiffeners (e.g., notches, etc.) may be implemented.

Figure 2B:
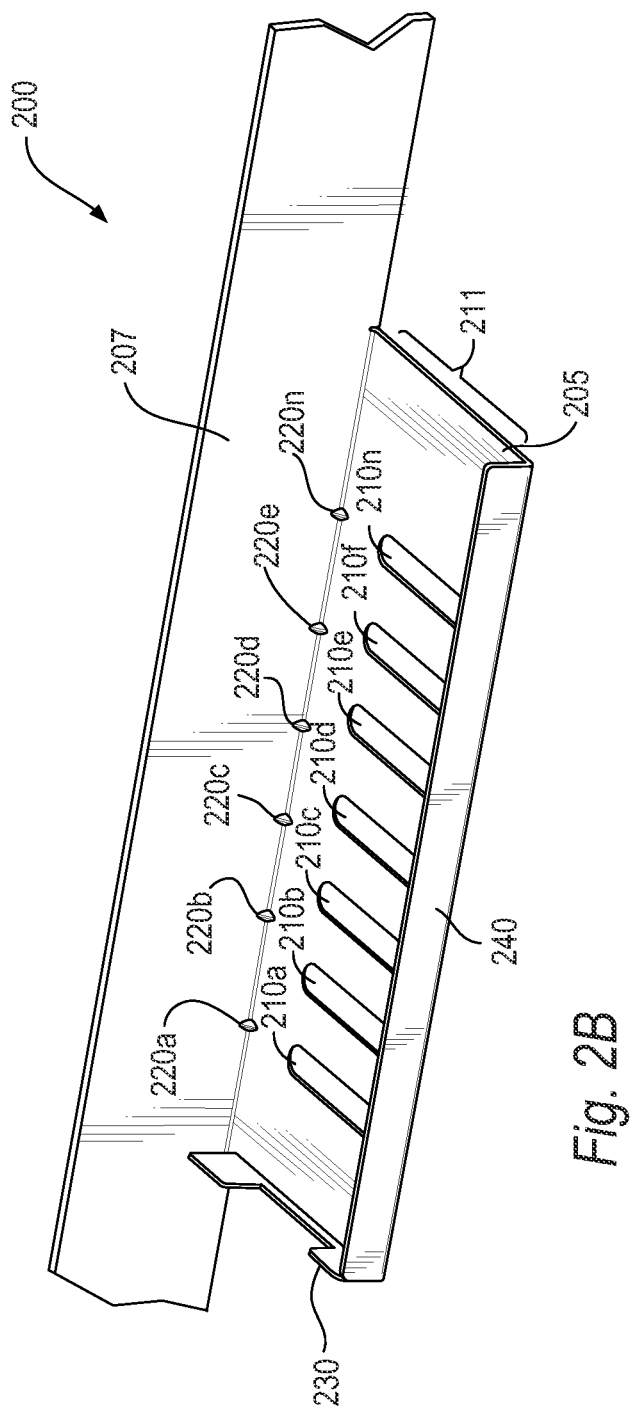
FIG. 2B is an isometric view of an attachment bracket including a base tray and a band in accordance with an embodiment of the invention.

FIG. 2B is an isometric view of an attachment bracket 200 including a base tray 205 and a band 207 in accordance with an embodiment of the invention. Base tray 205 includes a side wall 240, which may act as a guide rail for positioning an external power supply during installation in attachment bracket 200. A back wall 230 is also included for ease of positioning. In certain configurations of attachment bracket 200, back wall 230 may also provide support to the installed external power supply. For example, where an attachment bracket is coupled to an electrical device that is being mounted in a vertical configuration, back wall 230 provides support by restricting vertical movement of the external power supply. In other configurations, both back wall 230 and side wall 240 are configured to provide support to the installed external power supply.

A width 211 of base tray 205 may accommodate external power supplies of various sizes. Where multiple external power supplies are anticipated for use with attachment bracket 200, base tray 205 may be sized to accommodate the widest of these external power supplies. Even if a narrow power supply brick is used, resulting in a gap between the installed external power supply and side wall 240, base tray 205 and an arm are configured to provide sufficient support to couple the external power supply to band 207. In another embodiment, a wall (not shown) extends from an edge of base tray 205 that opposes back wall 230. The wall is similar to back wall 230 and together with back wall 230, side wall 240, base tray 205, and an arm or other mounting members, the external power supply is supported in all orientations.

FIG. 3A is a front isometric view of an attachment bracket 300 including a base tray 305 and a band 307 in accordance with an embodiment of the invention. Band 307 includes spacers 310a-n to create an air gap between an installed external power supply and band 307, preventing or otherwise limiting heat transfer from the external power supply and a powered device to which attachment bracket 300 is coupled. In one embodiment, spacers 310a-n are formed as spherical dimples, ridges, etc. Band 307 further includes an opening 340 which is configured to expose a device control of the electronic device to an exterior of band 307. For example, the control may be a power on/off switch, a Kensington lock, etc. An aperture 350 is formed on band 307 to expose the electronic device's cable management hardware to the exterior of band 307. As used herein; cable management hardware may include cable retaining clips, rings, clamps, ties, D-lance, and the like. In another embodiment, the cable management hardware may be integrated on band 307, for example, where the electronic device does not include such cable management hardware itself.

FIG. 3B is a back isometric view of an attachment bracket 300 including a base 305 tray and a band 307 in accordance with an embodiment of the invention. As shown, band 307 includes spacers 310a-n, an opening 340, and an aperture 350.

Figure 3C:
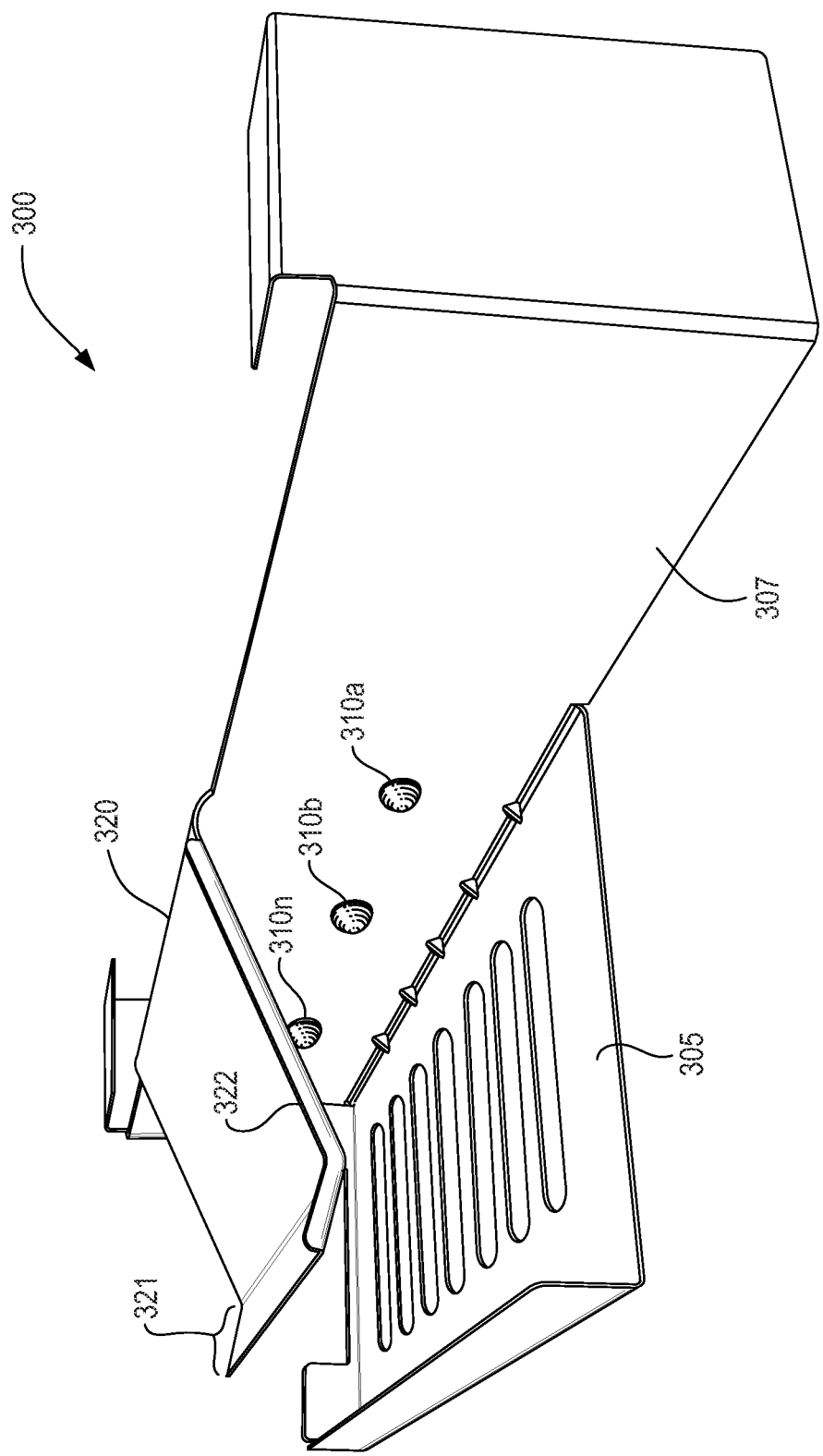
FIG. 3C is an isometric right side view of an attachment bracket including a base tray and a band in accordance with an embodiment of the invention.

FIG. 3C is an isometric right side view of an attachment bracket 300 including a base tray 305 and a band 307 in accordance with an embodiment of the invention. As shown, band 307 includes a side view of spacers 310a-n formed as dimples. Attachment bracket 300 further includes an arm 320, which is comprised of an arm handle 321 and an arm stiffener 322.

FIG. 4 is an isometric view of an attachment bracket 405, a powered device 410, and an installed power supply 430 in accordance with an embodiment of the invention. As shown, attachment bracket 405 includes a left ear assembly 415, a right ear assembly 412, a band 407, an arm 420, and a tray 440. Powered device 410 is coupled to attachment bracket 405 via left ear assembly 415 and right ear assembly 412. External power supply 430 is coupled to attachment bracket 405 via arm 420 and tray 440.

Figure 5:
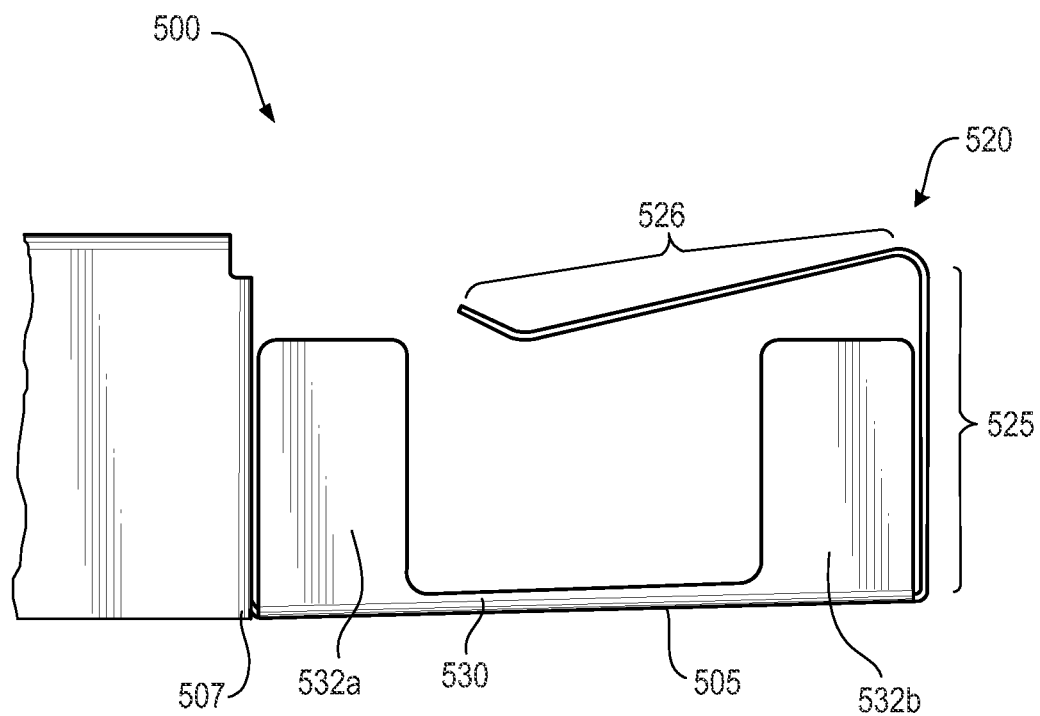
FIG. 5 is a left side view of an attachment bracket in accordance with an embodiment of the invention.

FIG. 5 is a left side view of an attachment bracket 500 in accordance with an embodiment of the invention. As shown, attachment bracket 500 includes a band 507, a base tray 505, and an arm 520. The base tray 505 extends from a first edge of band 507. Arm 520 extends from an outer edge portion of base tray 505. The outer edge portion is a distal edge portion from where band 507 adjoins base tray 505. Arm 520 is formed preferably by bending a corresponding marginal portion of base tray 505 at a right angle creating a vertical portion 525 of arm 520 and bending a corresponding portion of the vertical portion 525 at a right angle in excess of ninety degrees creating an engaging member 526. Engaging member 526 is formed with a downward angle toward base tray 505. Similar to the arm as described with respect to FIG. 1A, arm 520 is a spring-like component, providing a downward compression force when the power adaptor is installed. The angle at which engaging member 526 of arm 520 extends toward base tray 505 provides adequate support for the external power supply when it is installed in attachment bracket 500. Arm 520 may include an arm handle and/or an arm stiffener.

Together, base tray 505 and arm 520 are configured to provide support for the external power supply. In particular, base tray 505 provides support for one side of the external power supply by applying a force in a first direction, and arm 520 provides support for an opposing side of the external power supply by applying a downward compression force in a second direction, where the second direction opposes the first direction. In one embodiment, the application of these forces produces a friction fit between attachment bracket 500 and the external power supply. When installed, the external power supply is placed between base tray 505 and arm 520. Arm 520 is configured to deflect under the load of the external power supply, provide the prescribed support, and recover its initial shape when unloaded.

Attachment bracket 500 includes a back wall 530 which is configured to provide support to an installed external power supply. Back wall 530 includes a left flange 532a and a right flange 532b. Left flange 532a is elongated and affixed to a vertical portion 525 of arm 520, for example by spot welding, to provide further rigidity to arm 520.

Figure 6:
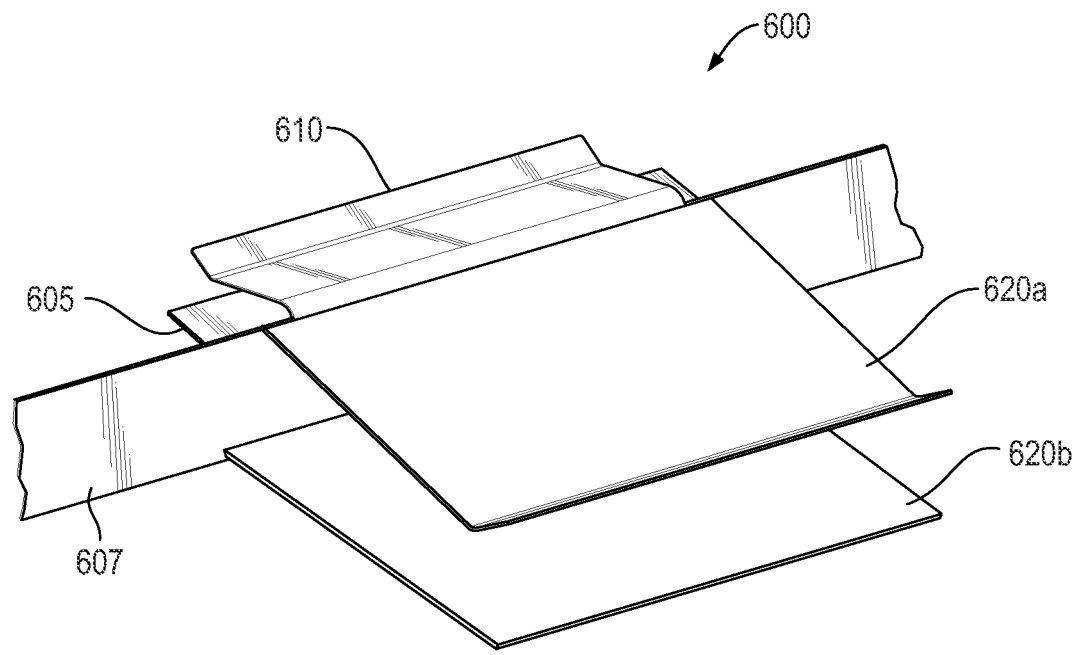
FIG. 6 is a back isometric view of an attachment bracket in accordance with an embodiment of the invention.

FIG. 6 is a back isometric view of an attachment bracket 600 in accordance with an embodiment of the invention. Attachment bracket 600 includes base tray 605, band 607, arm 610, and fasteners 620a-b. Together, fasteners 620a-b are configured to couple attachment bracket 600 to an electronic device. Fastener 620a is a spring-like component, providing a downward compression force, which extends from a top portion of band 607 at a downward angle. Fastener 620a is functionally similar to an arm as described herein in that it provides support for one side of a device, such as the electronic device, by applying a force in a first direction.

Fastener 620b is functionally similar to a base tray as described herein in that it provides support for an opposing side of a device, such as the electronic device, by applying a force in a second direction, where the second direction opposes the first direction. In one embodiment, the application of these forces produces a friction fit between attachment bracket 600 and the electronic device. The electronic device is placed between fasteners 620a-b.

In one embodiment, fasteners 620a-b may be fabricated from a piece of metal separate from the metal used to fabricate other portions of attachment device 600, and affixed (e.g., spot welded, etc.) to attachment device 600 for example at band 607.

In another embodiment, fasteners 620a-b may be fabricated from metal, such as sheet metal, and formed by shaping the same single piece of metal used to fabricate other portions of attachment device 600. For example, fasteners 620a-b may be formed to flank either sides of arm 610 and base tray 605, and bent in a direction opposing arm 610 and base tray 605. As shown, fastener 620b does not include any walls. In one embodiment, fastener 620b may include a side wall and/or one or more back walls.

FIG. 7A is a front isometric view of an attachment bracket 700 including a left ear assembly 715 and a right ear assembly 710 for band 707 in accordance with an embodiment of the invention. The left ear assembly 715 and a right ear assembly 710 are configured to couple attachment bracket 700 to an electronic device. Mounting apertures 705a-b are defined on right ear assembly 710 and are configured such that various different combinations thereof correspond to various different types of electronic devices having various different standard configurations of screw holes, Mounting apertures 705a-b are aligned with one or more of these screw holes. Fasteners such as spring-mounted thumb screws 752a-b are extended through mounting apertures 705a-b to engage in the corresponding screw holes on the exterior panel of the electronic device. In other embodiments, left ear assembly 715 and a right ear assembly 710 may be defined with metal pins, screws, tabs, or other hardware fasteners which couple attachment bracket 700 to an electronic device.

FIG. 7B is a back isometric view of an attachment bracket 700 including a left ear assembly 715 and a right ear assembly 710 in accordance with an embodiment of the invention. An aperture 720 is defined on left ear assembly 715 to expose a device control (e.g., Kensington lock) on the electronic device to an exterior of left ear assembly 715. A plurality of extrusions 706a-b, such as pins, are defined on left ear assembly 715 to couple attachment bracket 700 to the electronic device. Extrusions 706a-b are fabricated out of metal, such as steel, and correspond to various different types of electronic devices having various different standard configurations of attachment holes. Extrusions 706a-b are aligned with one or more of these attachment holes (e.g., screw holes). In assembly, extrusions 706a-b engage the corresponding attachment holes on the exterior panel of the electronic device. In other embodiment, left ear assembly 715 and a right ear assembly 710 may be defined with screws or other hardware fasteners which couple attachment bracket 700 to an electronic device.

Figure 7C:
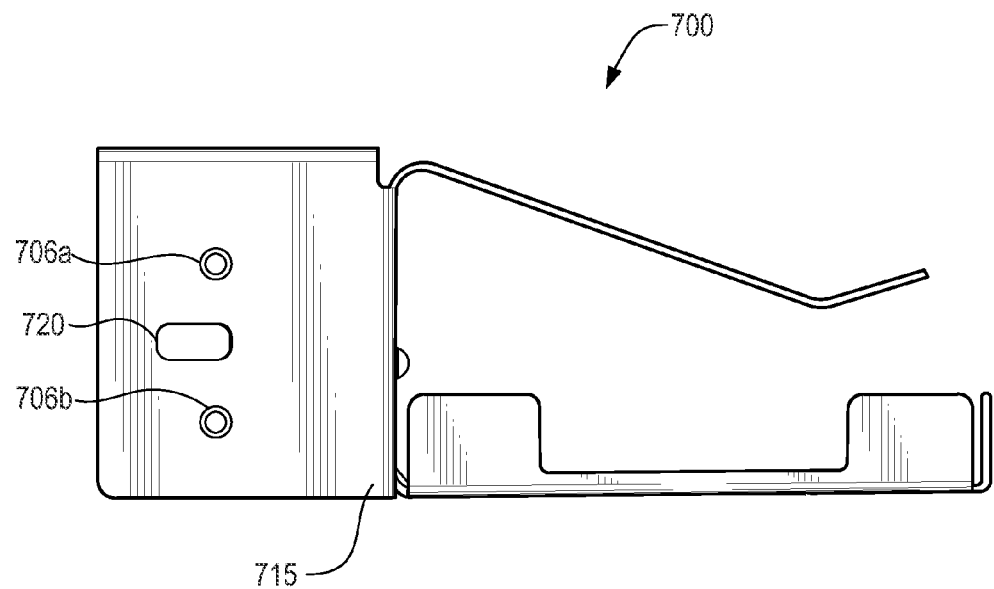
FIG. 7C is a left side view of an attachment bracket including a left ear assembly and a right ear assembly in accordance with an embodiment of the invention.

FIG. 7C is a left side view of an attachment bracket 700 including a left ear assembly 715 and a right ear assembly in accordance with an embodiment of the invention. As shown, pins 706a-b and aperture 720 are defined on left ear assembly 715.

Figure 7D:
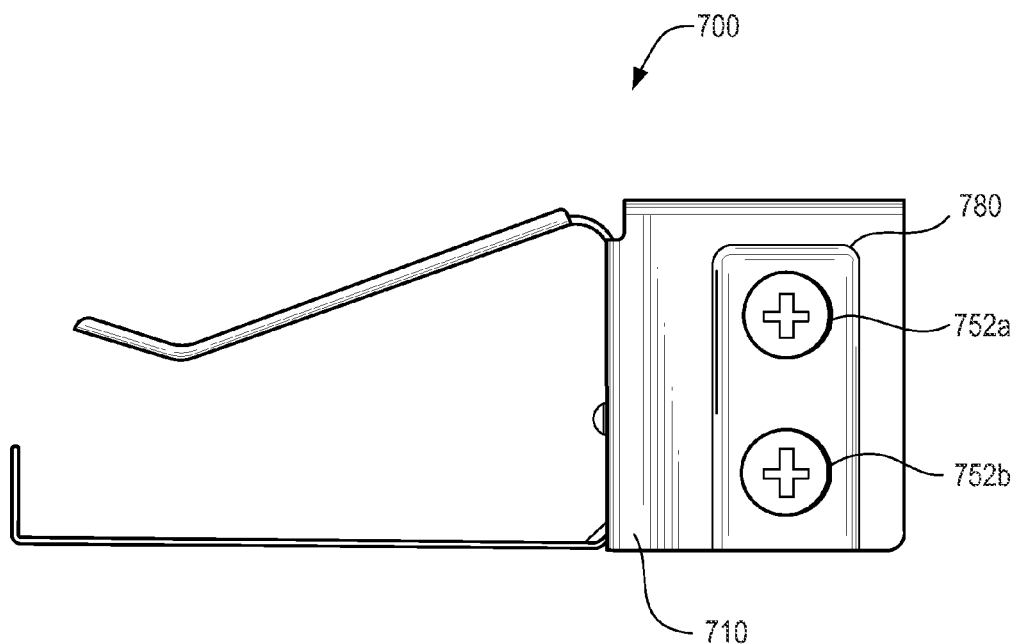
FIG. 7D is a right side view of an attachment bracket including a left ear assembly and a right ear assembly in accordance with an embodiment of the invention.

FIG. 7D is a right side view of an attachment bracket 700 including a left ear assembly and a right ear assembly 710 in accordance with an embodiment of the invention. A raised portion 780 is defined on right ear assembly 710, extending outwardly. In assembly, spring-mounted thumb screws 752a-b are extended through mounting apertures which are defined on the raised portion 780 of right ear assembly 710. The raised portion 780 provides a gap or clearance, for two purposes. First, the raised portion 780 provides a tension when force is applied from the spring-mounted thumb screws 752a-b or other hardware fastener. Second, the spring-mounted thumb screws 752a-b are able to retract into the raised portion 780.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. An attachment apparatus for an external power supply, the apparatus comprising:
    a band;
    an arm extending from a first edge of the band, the arm adapted to support a second side of the external power supply;
    a base tray extending from a second edge of the band, the base tray adapted to support a first side of the external power supply; and
    a fastener member extending from the band, the fastener member adapted to couple the attachment apparatus to an exterior panel of an electronic device powered by the external power supply,
    wherein the band is formed with a plurality of spacers to provide an air gap between the external power supply and the band when the external power supply is installed in the attachment apparatus.

2. The apparatus of claim 1, wherein the arm exerts a force in a first direction upon the power supply unit and the base tray exerts a force in a direction opposing the force exerted by the arm.

3. The apparatus of claim 1, wherein the arm comprises an arm handle portion formed as a ridge along a first edge of the arm.

4. The apparatus of claim 1, wherein the arm comprises a stiffener portion extending along a second edge of the arm, wherein the rigidity of the arm is increased with respect to flexing about a traverse axis.

5. The apparatus of claim 1, wherein the base tray is formed at an angle of inclination to a horizontal plane.

6. The apparatus of claim 1, wherein the base tray includes a plurality of ventilation slots, and wherein the attachment apparatus includes a plurality of notches formed at an edge where the band adjoins the base tray, wherein the rigidity of the base tray is increased with respect to flexing about an axis traversing the edge where the band adjoins the base tray.

7. The apparatus of claim 1, wherein the base tray includes a side wall adapted to position the external power supply during installation in the attachment apparatus, and a back wall adapted to restrict vertical movement of the external power supply.

8. The apparatus of claim 1, wherein the band is formed with at least one opening adapted to expose a device control on the electronic device to an exterior of the band.

9. The apparatus of claim 1, wherein the band is formed with at least one aperture.

10. The apparatus of claim 1, wherein the band is formed with a fastener.

11. An attachment bracket for coupling to an external power supply, the attachment bracket comprising:
    a band including a right ear assembly and a left ear assembly; and
    a mounting member extending from the band adapted to couple the external power supply to the attachment bracket;
    wherein the right ear assembly includes a mounting aperture aligned with a screw hole on the exterior panel of an electronic device powered by the external power supply, the mounting aperture adapted for receiving a hardware fastener extending through the right ear assembly and engaging the screw hole; and
    the left ear assembly includes an extrusion aligned with an attachment hole on the exterior panel of the electronic device, the extrusion adapted for engaging the attachment hole.

12. The attachment bracket of claim 11, wherein the hardware fastener is a spring-mounted thumb screw.

13. An attachment apparatus comprising:
    a band;
    a base tray extending from a first edge of the band, the base tray adapted to support first side of an external power supply, wherein the base tray includes a plurality of ventilation slots;
    an arm extending from an outer edge portion of the base tray, the arm adapted to support a second side of the external power supply; and
    a fastener member extending from the band, the fastener member adapted to couple the attachment apparatus to an exterior panel of an electronic device powered by the external power supply.

14. The apparatus of claim 13, wherein the aim comprises a vertical portion and an engaging member, wherein the engaging member is formed with a downward angle toward the base tray.

15. The attachment bracket of claim 11, comprising an arm including a stiffener portion extending along an edge of the arm, wherein the rigidity of the arm is increased with respect to flexing about a traverse axis.

16. The attachment bracket of claim 11, wherein the band is formed with a plurality of spacers providing an air gap between the external power supply and the band if the external power supply is installed in the attachment bracket.

17. The attachment bracket of claim 11, comprising, a base tray including a plurality of ventilation slots.

18. The attachment apparatus of claim 13, wherein the band is formed with a plurality of spacers providing an air gap between the external power supply and the band if the external power supply is installed in the attachment apparatus.

19. The attachment apparatus of claim 13, wherein the arm comprises a stiffener portion extending along a second edge of the arm, wherein the rigidity of the arm is increased with respect to flexing about a traverse axis.

* * * * *

UNITED STATES PATENT AND TRADEMARK OFFICE
CERTIFICATE OF CORRECTION

PATENT NO. : 8,424,826 B2
APPLICATION NO. : 12/902824
DATED : April 23, 2013
INVENTOR(S) : David L. Santos et al.

It is certified that error appears in the above-identified patent and that said Letters Patent is hereby corrected as shown below:

In the Claims:

In column 8, line 17, in Claim 11, delete "bracket;" and insert -- bracket, --, therefor.

In column 8, line 23, in Claim 11, delete "hole;" and insert -- hole, --, therefor.

In column 8, line 33, in Claim 13, after "support" insert -- a --.

In column 8, line 43, in Claim 14, delete "aim" and insert -- arm --, therefor.

In column 8, line 56, in Claim 17, delete "comprising," and insert -- comprising --, therefor.

Signed and Sealed this
Tenth Day of September, 2013

Teresa Stanek Rea
*Acting Director of the United States Patent and Trademark Office*